| United States Patent | [15] | 3,664,930 |
| --- | --- | --- |
| Pottiez et al. | [45] | May 23, 1972 |

[54] PROCESS FOR THE REGENERATION OF ALKANOLAMINES BY DISTILLATION, ALKALI HYDROXIDE TREATMENT, HEAT, PHASE SEPARATION AND DISTILLATION

[72] Inventors: Fernand Pottiez, Ostende; Raphael Verbeest, Roulers, both of Belgium

[73] Assignee: UCB, Societe Anonmy

[22] Filed: Mar. 11, 1969

[21] Appl. No.: 806,270

[30] Foreign Application Priority Data

Mar. 14, 1968    Great Britain ...................... 12,506/68

[52] U.S. Cl. ................................ 203/37, 203/39, 203/85, 203/95, 23/2, 55/68
[51] Int. Cl. ..................................... B01d 3/34, C07c 91/04
[58] Field of Search .................. 55/68, 72; 23/2; 203/37, 39, 203/95–97, 36, 81, 74, 83, 85, 79; 260/584 R

[56] References Cited

UNITED STATES PATENTS

| 2,785,045 | 3/1957 | Wan et al. | 23/2 R |
| 2,914,469 | 11/1959 | Anderson et al. | 203/37 |
| 3,347,621 | 10/1967 | Papadopoulos | 23/2 |
| 3,420,885 | 1/1969 | Schroeder | 260/584 |
| 3,463,603 | 8/1969 | Freitas et al. | 55/68 |

Primary Examiner—Wilbur L. Bascomb, Jr.
Attorney—Wenderoth, Lind & Ponack

[57] ABSTRACT

A process for the regeneration of dialkanolamines from their thermostable degradation products with impurities of gases, formed during the washing of said gases with dialkanolamine-containing washing liquors, which comprises adding to the concentrated distillation residues containing said degradation products a 15 to 25% aqueous sodium hydroxide solution or a 25 to 35% aqueous potassium hydroxide solution, either containing the stoichiometric quantity of 100% NaOH or KOH, heating to boiling for at least 15 minutes whereupon two phases are obtained, an aqueous and an organic, decanting the latter and distilling it to eliminate alkali and excess water and recycling the regenerated alkanolamine to the gases washing stage.

12 Claims, No Drawings

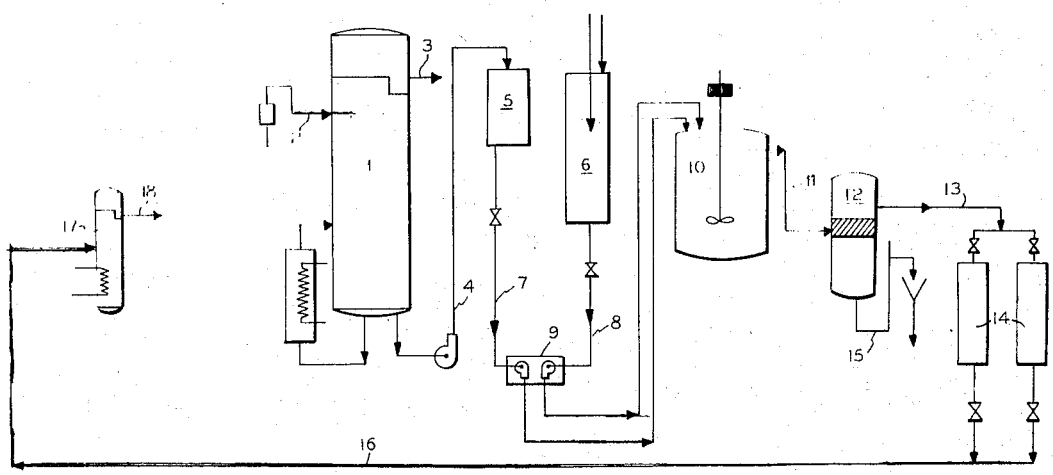

Patented May 23, 1972 3,664,930
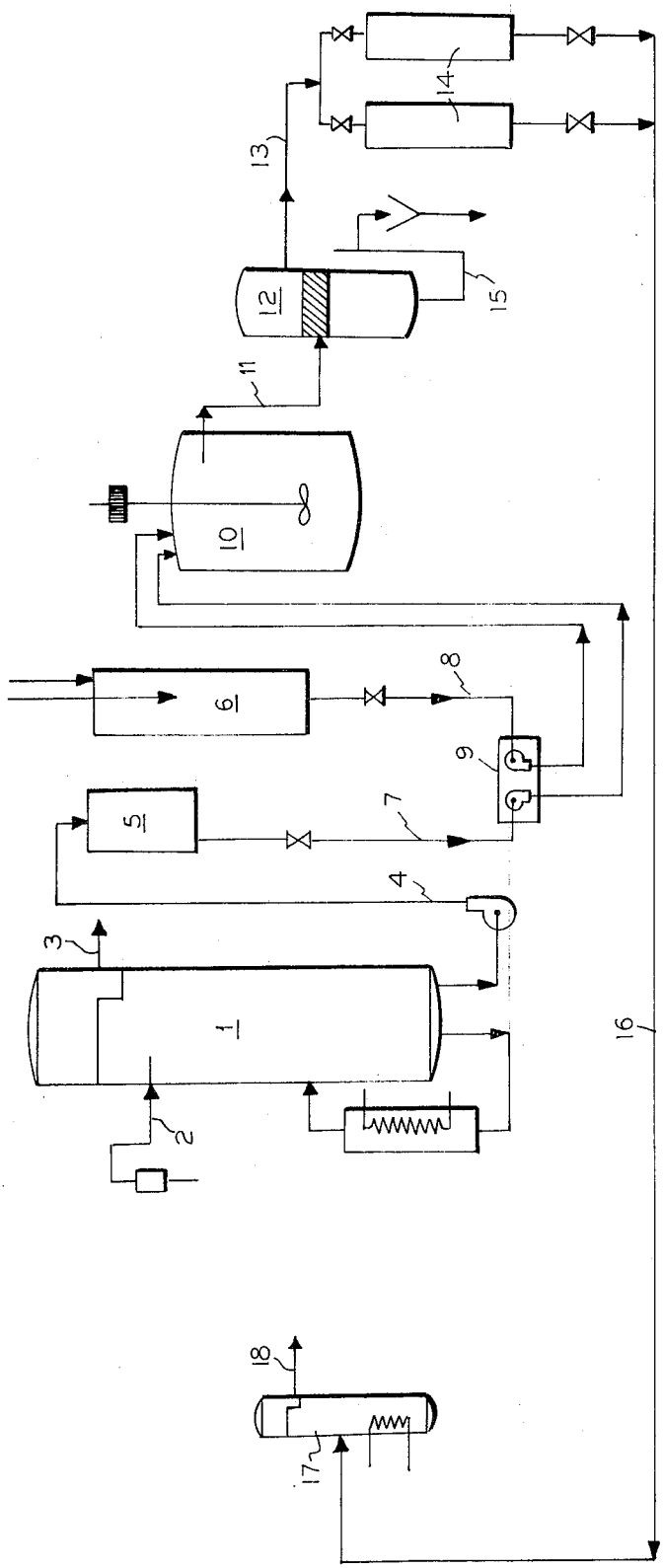
INVENTORS
FERNAND POTTIEZ
RAPHAËL VERBEEST
BY Wenderoth, Lind & Ponack
ATTORNEYS

PROCESS FOR THE REGENERATION OF ALKANOLAMINES BY DISTILLATION, ALKALI HYDROXIDE TREATMENT, HEAT, PHASE SEPARATION AND DISTILLATION

The present invention is concerned with a process for the regeneration of alkanolamines and, more particularly, with a process for the regeneration of liquors containing alkanolamines which have been used for the removal of sulfur compounds and of carbon dioxide from gaseous or vaporous mixtures.

Although the process according to the present invention is of general applicability and may be applied to liquors containing any kind of alkanolamine, it is proposed to illustrate the process according to the present invention using, by way of example, the regeneration of liquors containing, as the alkanolamine, diisopropanolamine (which is hereinafter briefly referred to as DIPA).

In the purification process of gases with which the present invention is concerned, there is used, in particular, a desulfurizing and decarbonizing liquor which has the following approximate composition.

45% DIPA

40% tetrahydrothiophene dioxide (or sulfolane) or another physical solvent

15% water

The DIPA removes almost all of the hydrogen sulfide by chemical combination, while the sulfolane removes about 90 percent of the carbonyl sulfide by physical dissolution. At the same time, a part of the carbon dioxide is also eliminated.

In principle, it is thereafter sufficient to heat this purification liquor in a continuous or discontinuous manner in order to get rid of the gaseous impurities, such as hydrogen sulfide, carbonyl sulfide and carbon dioxide, which have been absorbed and to return the liquor to the purification system for a further absorption-desorption cycle.

However, it has been found that the regeneration of the DIPA is not complete because it forms thermostable degradation products with certain impurities, under the normal conditions of regeneration. Indeed, by reaction with carbon dioxide there is formed the carbamate of DIPA which is converted by cyclization into an oxazolidone of the formula:

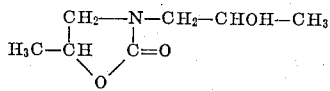

while with carbonyl sulfide, DIPA forms the corresponding thiocarbamate. Furthermore, a loss of DIPA is noticed due to the formation of the formate of DIPA or of the formamide of. DIPA when hydrocyanic acid is present in the gas to be purified.

The degradation products of DIPA thus formed increase the viscosity of the washing liquor and considerably complicate the efficient functioning of the purification installation. When the amount of these degradation products becomes very troublesome, a portion of the washing liquor is removed continuously or discontinuously and subjected to distillation. There is thus obtained, on the one hand, a distillate which is recycled directly to the purification of the gas as washing liquor, and, on the other hand, there is obtained a residue with a high content of oxazolidone (for example, 80 percent by weight) and of sulfolane (for example, 12 percent by weight) which is lost if it were not possible to economically regenerate the DIPA contained in the degradation products derived therefrom.

For this reason, it has already been proposed to decompose the salts of alkanolamines by the addition of a strong base, such as sodium hydroxide or sodium carbonate (see KOHL & RIESENFELD, Gas Purification, pub. McGraw-Hill Co., 1960, p. 78-83) and there is also known an analytical procedure for determining exactly the equivalent quantity of Sodium hydroxide necessary for the reactivation of the combined alkanolamine (see R.J. BLAKE, Oil & Gas J., 61, (1963, No. 36), 134).

This process for the recovery of alkanolamines starting from the distillation residue in which the residue is subjected to the action of a strong alkali permits an almost quantitative recovery. Nevertheless, there are difficulties to be overcome in carrying out the process. Indeed, the precipitate of sodium carbonate formed is difficult to separate by filtration. Furthermore, the retention of the organic products (DIPA and physical solvent) in the filter cake is high and this makes the operation of doubtful economy. In addition, because of the solubility of sodium carbonate in water, it is impossible to wash out the filter cake with water.

It is an object of the present invention to overcome the abovementioned difficulties encountered in the recovery of DIPA and of the physical solvent, starting from this distillation residue. We have overcome these difficulties by means of a process which permits the omission of the filtration and washing operations which complicate the regeneration of the distillation residue.

According to the present invention, in the process for the purification of gases by means of a washing liquor containing a dialkanolamine and a physical solvent in which the spent liquor is subjected to a distillation for the recovery of the dialkanolamine and eventually the physical solvent and in which the distillation residue is subjected to heating with an alkali metal hydroxide in order to decompose the degradation products formed between the dialkanolamine and the impurities in the gases to be purified, there is added to the distillation residue the stoichiometric quantity of alkali metal hydroxide necessary for the regeneration of the dialkanolamine from the said degradation products, in the presence of the quantity of water necessary for the system thus obtained to separate, after the said heating, into an organic phase and an aqueous phase, the organic phase containing the regenerated dialkanolamine and the eventually present physical solvent then being recovered by decantation, whereafter the recovered organic phase is distilled and the distillate containing the regenerated dialkanolamine and the eventually present physical solvent is recycled to the gases purification stage.

The dialkanolamine used according to the invention is preferably diisopropanolamine (DIPA); however the process according to the invention can be applied to amines in general which are used for the purification of gases, which form thermostable compounds with the impurities contained in these gases and which can be regenerated without decomposition by hydrolysis by means of alkali metal hydroxides.

Two cases are considered in the following, depending on whether the alkali metal hydroxide used is sodium hydroxide or potassium hydroxide.

In the case of sodium hydroxide, the concentration of the sodium hydroxide is selected in such a manner as to clearly avoid the precipitation of sodium carbonate.

If the solution is too concentrated, sodium carbonate precipitates whereas if the solution is too dilute, the separation into two liquid phases does not occur.

It is obvious that the optimum concentration of sodium hydroxide depends upon the quantity of sodium carbonate formed and thus on the concentration of the oxazolidone introduced.

For a concentrated residue containing 70% oxazolidone, it is necessary to use a 25% solution of sodium hydroxide while for a concentrated residue containing 85% oxazolidone, it is necessary to use a 15% solution of sodium hydroxide.

When using a 10 percent solution of sodium hydroxide, a separation into two liquid phases is no more obtained. It is for this reason that, in the case of sodium hydroxide, the amount of water is adjusted in such a manner that the sodium hydroxide added to the residue to be regenerated forms an aqueous solution containing 15-25 percent by weight, preferably about 20 percent by weight, of sodium hydroxide.

In the case of potassium hydroxide, because of the great solubility of potassium carbonate, the optimum concentration of potassium hydroxide is higher and is advantageously 25–35 percent, preferably in the region of 30 percent.

The regeneration temperature is preferably the boiling temperature of the system under conditions of normal pressure and the duration of the regeneration is at least 15 minutes.

The following Examples are given for the purpose of illustrating the present invention. All parts and percentages are by weight unless otherwise stated.

In these examples, wherein diisopropanolamine (DIPA) is chosen as dialkanolamine, the regeneration reaction takes place according to the equation:

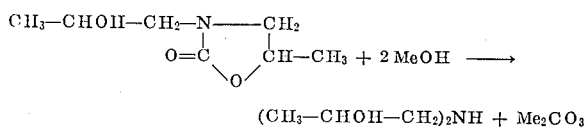

$$(CH_3-CHOH-CH_2)_2NH + Me_2CO_3$$

Me being sodium or potassium.

On a molecular weight basis, 159 g. oxazolidone and 80 g. sodium hydroxide give 133 g. DIPA and 106 g. sodium carbonate, or 159 g. oxazolidone and 112 g. potassium hydroxide give 133 g. DIPA and 138 g. potassium carbonate.

EXAMPLE 1

A synthetic mixture having the following composition is subjected to hydrolysis:
oxazolidone : 88% by weight
DIPA : 12% by weight.

To 1,000 g. of this mixture, the stoichiometric amount of sodium hydroxide in the form of a 20 percent aqueous solution is added, i.e.
442.7 g. of 100% sodium hydroxide and
1770.8 g. water.

The mixture is heated to boiling for 15 minutes. Two liquid phases are thus obtained having the following composition.

| constituent | aqueous phase | organic phase |
|---|---|---|
| | (in g.) | (in g.) |
| DIPA | 7.45 | 848.7 |
| oxazolidone | — | traces |
| sodium carbonate | 502.2 | 84.4 |
| water | 980.6 | 790.2 |
| total | 1490.25 | 1723.3 |

Balance

One thousand grams of this synthetic mixture contain 880 g. oxazolidone, i.e. (880 × 133)/159 = 736.1 g. DIPA. To this result, 120 g. DIPA contained in the initial mixture must be added, which gives a theoretical total of 856.1 g. DIPA.

From the abovementioned Table it can be seen that the organic phase contains 848.7 g. DIPA. This gives a recovery ratio of 848.7/856.1 = 99.1%.

In order to eliminate the dissolved alkali and to reduce the amount of water in the organic phase, this latter is subjected to distillation.

EXAMPLE 2

In the Belgian Pat. Specification No. 657,159, a solution for the washing of gases is proposed which has the following composition:
DIPA : 47% by weight
a mixture of dimethylethers of polyethylene glycol : 47% by weight
water: 6% by weight In order to simulate the regeneration of a washing solution of this type, the following composition was subjected to hydrolysis under the same conditions as in Example 1:
DIPA : 10% by weight
dimethyl ether of diethylene glycol : 10% by weight
oxazolidone : 80% by weight To 1,000 g. of this synthetic mixture, the stoichiometric amount of a 20 percent sodium hydroxide solution corresponding to the oxazolidone content is added, i.e.
402.5 g. of 100% sodium hydroxide and
1610.0 g. water.

The mixture is heated to boiling for 15 minutes. Two liquid phases are thus obtained having the following composition:

| constituent | aqueous phase | organic phase |
|---|---|---|
| | (in g.) | (in g.) |
| DIPA | 6.7 | 762.4 |
| dimethylether of diethylene glycol | traces | ≈ 100 |
| oxazolidone | — | — |
| sodium carbonate | 451.3 | 82 |
| water | 881.3 | 728.7 |
| total | 1339.3 | 1673.1 |

Balance

One thousand grams of the initial mixture contain 800 g. oxazolidone, i.e. (800 × 133)/159 = 669.1 g. DIPA. To this result, 100 g. DIPA contained in the initial mixture have to be added, which gives a total of 769.1 g. DIPA.

The recovery ratio of DIPA in the organic phase is consequently: 762.4/769.1 = 99.1% by weight.

The recovery of dimethylether of diethylene glycol is practically total.

The organic phase is subjected to distillation before reintegration in the gases washing cycle.

EXAMPLE 3

This Example illustrates an experiment on industrial scale.

The fresh washing liquor used for the purification of the gas initially contains:
45% DIPA
40% sulfolane
15% water At the moment that this liquor is subjected to the regeneration, it has the following composition:
35.77% DIPA
24.72% sulfolane
18.75% oxazolidone
20.76% water The liquor to be regenerated is fed at a rate of 125 kg./hour into a distillation apparatus. This operation provides, on the one hand, 98.5 kg./hour of a distillate having the composition:
43.57% DIPA
28.24% sulfolane
2.25% oxazolidone
25.94% water and, on the other hand, 26.5 kg./hour of a residue having the composition:
6.85% DIPA
11.61% sulfolane
80.07% oxazolidone
1.47% water The distillate is recycled directly to the gases purification installation, while the residue is subjected to a regeneration process according to the present invention.

There are taken 1,000 g. of residue, having the analysis given above, to which are added, according to the process of the present invention, (800.7 × 80)/159 = 403 g. 100% sodium hydroxide and 4 × 403 = 1612 g. water, thus giving an aqueous solution comprising 19.85 percent by weight sodium hydroxide (taking into account the 1.47 percent water in the residue).

The mixture thus obtained is heated to boiling for the hydrolysis of the oxazolidone (boiling temperature of the mixture 109°C./760 mm.Hg.). After boiling for about 15 minutes, there is observed the separation into two phases. The chromatographic analysis indicates the disappearance of the oxazolidone peak which indicates that the hydrolysis of the oxazolidone into DIPA is complete. The mixture is then left to cool.

By decantation, there are recovered, on the hand, 1,680 g. of organic phase and, on the other hand, 1,335 g. of aqueous phase; these have respectively the following compositions:

| constituents | organic phase | aqueous phase |
|---|---|---|
| DIPA | 43.9% | 0.26% |
| sulfolane | 6.9% | traces |
| oxazolidone | traces | traces |
| sodium carbonate | 4.91% | 33.7% |
| water | 44.3% | 65.9% |

Balance

One thousand grams of the initial residue contain 800.7 g. oxazolidone which corresponds to $(800.7 \times 133)/159 = 670$ g. DIPA. However, the residue initially contained 68.5 g. free DIPA, which gives a total of $670 + 68.5 = 738.5$ g. DIPA.

After decantation, the organic phase contains $1680 \times 0.439 = 735$ g. DIPA.

After decantation, the aqueous phase contains $1335 \times 0.0026 = 3.5$ g. DIPA.

Thus, the regeneration of the DIPA can be regarded as being practically complete (99.5 percent).

With regard to the sulfolane, the recovery thereof is also practically complete:

initial amount of sulfolane in the residue : 116.1 g. per kg.
amount of sulfolane in the organic phase : 1680 g. × 0.069 = 116 g.

In order to eliminate the quantity of dissolved alkali and to reduce the amount of water in the organic phase, this latter is subjected to a distillation before returning to the gas purification cycle, while the aqueous phase of the decantation is discarded.

EXAMPLE 4

This Example illustrates the use of potassium hydroxide as regeneration agent.

To one thousand g. of a regeneration residue similar to that used in Example 3 having the following composition:

DIPA : 6.85%
sulfolane : 11.61%
oxazolidone : 80.07%
water : 1.47% the stoichiometric amount of a 30% aqueous potassium hydroxide solution is added, i.e. $(800.7 \times 112.2)/159 = 565.02$ g. of 100% potassium hydroxide and 1318.38 g. water (= 1883.4 g. of 30% KOH). After heating to boiling for 15 minutes, two liquid phases are obtained having the following composition:

| constituents | organic phase g. | % | aqueous phase g. | % |
|---|---|---|---|---|
| DIPA | 732.0 | 44.94 | 6.27 | 0.5 |
| sulfolane | 116.1 | 7.13 | — | — |
| potassium carbonate | 86.16 | 5.29 | 609.79 | 48.6 |
| water | 694.42 | 42.64 | 638.66 | 50.9 |
| oxazolidone | — | — | — | — |
| total | 1628.68 | 100.00 | 1254.72 | 100.0 |

The theoretical content of DIPA in the residue is $(800.7 \times 133)/159 = 670$ g. $+ 68.5 = 738.5$ g. DIPA. The abovementioned organic phase contains 732.0 g. DIPA. Consequently the recovery ratio of DIPA is $732.0/738.5 = 99.14\%$.

Concerning sulfolane, the Table hereinabove shows that the recovery ratio is 100 percent.

The organic phase is freed of potassium carbonate and of the greatest part of water by distillation and the distillate is recycled to the gases purification stage.

We claim:

1. A process for the regeneration of an alkanolamine contained in a washing liquor which has been used in the purification of a gas containing sulfur compounds and carbon dioxide, said washing liquor comprising said alkanolamine and thermostable degradation products formed between said alkanolamine and the gas impurities, which comprises subjecting said washing liquor to distillation, recovering a distillate comprising alkanolamine and a distillation residue comprising said degradation products, adding to said distillation residue the stochiometric quantity of an alkali metal hydroxide necessary for the regeneration of the alkanolamine from the said degradation products by a decomposition reaction thereof with the said alkali metal hydroxide, and such a quantity of water that, after heating the mixture thus obtained, phase separation into an organic phase and an aqueous phase occurs, heating the said mixture, allowing it to separate into phases after said heating, recovering by decantation the organic phase comprising the alkanolamine regenerated by said reaction, subjecting the recovered organic phase to distillation and recovering a distillate comprising the regenerated alkanolamine.

2. A process as claimed in claim 1, wherein the alkanolamine is diisopropanolamine.

3. A process as claimed in claim 1, wherein a physical solvent is present in said washing liquor.

4. A process as claimed in claim 3, wherein the physical solvent is a dimethyl ether of a polyethyleneglycol.

5. A process as claimed in claim 3, wherein the physical solvent is a dimethyl ether of diethyleneglycol.

6. A process as claimed in claim 3, wherein the physical solvent is sulfolane.

7. A process as claimed in claim 1, wherein the alkali metal hydroxide and water added are an aqueous solution of sodium hydroxide, the amount of water added to the distillation residue being adjusted in such a manner that the sodium hydroxide is present in the form of an aqueous solution containing 15 to 25 percent by weight of sodium hydroxide.

8. A process as claimed in claim 1, wherein the alkali metal hydroxide and water added are an aqueous solution of sodium hydroxide, the amount of water added to the distillation residue being adjusted in such a manner that the sodium hydroxide is present in the form of an aqueous solution containing 20 percent by weight of sodium hydroxide.

9. A process as claimed in claim 1, wherein the alkali metal hydroxide and water added are an aqueous solution of potassium hydroxide, the amount of water added to the distillation residue being adjusted in such a manner that the potassium hydroxide is present in the form of an aqueous solution containing 25–35 percent by weight of potassium hydroxide.

10. A process as claimed in claim 1, wherein the alkali metal hydroxide and water added is an aqueous solution of potassium hydroxide, the amount of water added to the distillation residue being adjusted in such a manner that the potassium hydroxide is present in the form of an aqueous solution containing 30 percent by weight of potassium hydroxide.

11. A process as claimed in claim 1, wherein said heating is carried out at the boiling temperature of the said mixture under normal pressure conditions.

12. A process as claimed in claim 1, wherein the duration of said heating is at least 15 minutes.

* * * * *